United States Patent Office 3,208,918
Patented Sept. 28, 1965

3,208,918
PROCESS FOR PURIFYING ENZYMES
Roland Frank Beers, Jr., 1406 Carrollton Ave., Baltimore, Md.
No Drawing. Filed Aug. 15, 1963, Ser. No. 302,457
5 Claims. (Cl. 195—66)

This invention relates to an enzyme purification process. More particularly, this invention concerns a process for the purification of enzymes useful in the synthesis of polynucleotides.

In accordance with this invention, a method is provided whereby enzymes useful in the synthesis of polynucleotides may be prepared substantially completely free from any detectable quantities of contaminating enzymes. In particular, the invention provides a method for the separation of enzymes from complex protein mixtures containing, for example, polynucleotide phosphorylase, phosphodiesterases, phosphatases, adenylate kinase and the like.

Various methods are known in the art to partially purify specific enzymes, such as polynucleotide phosphorylase, phosphodiesterases, ribonucleases, ribonucleic acid polymerases and similar enzymes. However, utilizing the known processes, it has been frequently impossible to completely purify these partially fractionated enzymes, and in particular, free polynucleotide phosphorylase from contaminating enzymes such as adenylate kinase, which attacks the substrates or products of the desired enzyme.

In the art, no one rule or procedure is available for the complete purification of an enzyme. In most purification techniques, the processes have been worked out in a more or less trial and error fashion according to the specific enzyme desired. Some of the more common purification methods used are, (1) maceration of tissue with an abrasive material, e.g., sand or high speed, specially designed pulverizers; (2) alternate freezing and thawing techniques; (3) dehydration, followed by grinding, leaving the material in an easily extractable form; and (4) autolysis. Water, glycerine, and various buffer solutions have been employed to dissolve the enzymes liberated by methods such as the foregoing, followed by dialysis to eliminate smaller molecules, both organic and inorganic. Protein impurities are often removed by alcohol, ammonium sulfate, or isoelectric precipitation. Attempts have also been made to precipitate the enzyme leaving the bulk of the impurities in solution. None of the foregoing methods have successfully purified enzymes completely free of contaminants.

Adsorption and elution procedures have also played an important role in enzyme purification. Under controlled conditions of pH, temperature and concentration, various adsorbents, for example, alumina and kaolin, preferentially adsorb certain molecules. By changing one or more of the conditions, usually the pH, varying degrees of success have been achieved by eluting the adsorbed molecules into pure solvent. All of these known techniques are relatively non-specific in their action and are usually laborious and require complicated and expensive laboratory equipment. In many instances these techniques have been incompletely successful in the purification of the enzymes. In the usual instance, the activity of the enzyme is greatly lessened and rarely is the enzyme produced free of contaminating enzymes.

Broadly, the method of this invention comprises forming a complex between the desired enzyme in the mixture to be purified, and a specific substrate for the enzyme. The inventive concept for this invention takes advantage of the high degree of specificity of the enzyme for its substrate which results in the formation of an enzyme-substrate complex. It is theorized that the spatial configuration and arrangement of individual substrate molecules are the important criteria in determining the specificity of many and perhaps all of the enzymes.

The term substrate, as referred to in this application, includes the specific substance acted on by a specific enzyme. By way of example of specific substrate material suitable for use in the method of this invention are the series of substances belonging to the general class of polyribonucleotides, for example, polyadenylic acid (poly A), polyuridylic acid, polyinosinic acid and polycytidylic acid. Numerous of these polyribonucleotide substrates have been prepared synthetically and have been found quite suitable in the method of this invention.

A specific embodiment of the invention comprises combining a substrate material as defined above, with an insoluble material, contacting the enzyme mixture to be purified with the substrate-insoluble material complex to form a specific enzyme-substrate complex and thereafter eluting the enzyme from the substrate material and subsequently separating the highly purified enzyme from the eluate solution. It is important in the method of this invention that the affinity of the substrate material and the insoluble material be great enough to prevent elution by the elutrient. A suitable insoluble material useful as adsorbent is the cellulose resin, diethylaminoethylcellulose (DEAE-cellulose). Carboxymethyl cellulose, phosphoric acid cellulose, and a composition made from epichlorohydrin, triethanolamine and cellulose (ECTEOLA-cellulose) bind poly A very loosely and are not as effective. Certain exchange resins, for example Dowex 1–x8, Dowex 2–x8 and Amberlite IR400 also bind polynucleotides, but during elution of the enzymes these polymers also are eluted. As pointed out above, it is essential that the absorbent or insoluble material be of a character that has a high degree of affinity for the substrate material.

The following examples will illustrate the purification of specific enzymes utilizing the method of this invention; however, it is to be understood that the examples are not to be considered as limitations upon the scope of the inventive concepts.

PREPARATION OF SUBSTRATE-ADSORBENT COLUMN

Example 1

Polyadenylic acid synthesized by the action of partially purified preparations of polynucleotide phosphorylase on adenosine diphosphate was used as a substrate. The polymer was freed of contaminating proteins by known techniques. The purified polymer was dialyzed against distilled water for 24 hours at 4° C. A solution of the polymer having a concentration of about 0.01 M. organic phosphate was applied to a column of diethylaminoethylcellulose used as the adsorbent material.

The adsorbent containing 0.87 milliequivalent per gram when suspended in water bound 0.12 g. of the substrate material, polyadenylic acid, per gram of cellulose, or approximately 0.4 milliequivalent of polyadenylic acid per gram of cellulose.

The solution of substrate material was allowed to flow through the adsorbent until the concentration of the substrate in the eluate was equal to the concentration of the substrate applied to the column. The column was then washed with water until the eluate was free of substrate material.

The column of substrate-adsorbent material was then washed with a 1.0 M. solution of potassium chloride, pH 8, buffered with 0.01 M. tris (hydroxymethyl) aminomethane (tris buffer) to remove any short chain polymers poorly adsorbed to the column. It will be appreciated that any monovalent salt is suitable for use in removing short chain polymers. Repeated washing failed to remove any of the polyadenylic acid from the column. Repeated fractionations of various enzyme preparations also failed to remove any of the substrate material. Any of the well known chromatographic column techniques may be used in the method of this invention. Care should be exercised to not overload the substrate-adsorbent material. In the preferred embodiment the enzyme preparation to be purified does not exceed 25% of the column capacity.

Prior to each fractionation, the substrate-adsorbent material is washed with TEM buffer (a solution containing 10 mM. Tris, pH 8, mM. ethylenediamine tetraacetate and mM. β-mercaptoethanol) until the eluate contains no ultra-violet adsorbent material (260 mμ, where diethylaminoethylcellulose is used as the adsorbent).

ENZYME ASSAY

The activity, hence quantity of enzymes purified in the process of this invention was determined as follows:

An assay mixture is prepared by adding to a clinical centrifuge tube 0.5 ml. of each of the following:

(1) Enzyme fraction
(2) 0.01 M. magnesium chloride
(3) 0.1 M. tris, pH 9.5
(4) 1 M. potassium chloride
(5) 0.2 mM. yeast ribonucleic acid dephosphorylated by the action of *E. coli* alkaline phosphatase The centrifuge tube is brought to 37° C. in a water bath, and 0.5 ml. of a 0.4% solution of adenosine diphosphate (ADP) is added with agitation. After 20 minutes, 1 ml. of 5% HClO₄ is added, the contents mixed thoroughly and centrifuged in a clinical centrifuge at 1,500 r.p.m. for 10 minutes. The inorganic phosphate released by the enzyme-catalyzed reaction is determined by the Fiske and Subbarow method. Under the conditions of the assay, the amount of inorganic phosphate released is proportional to the enzyme concentration.

For purposes of illustration, the examples illustrating the method of this invention which follow are directed to the purification of enzyme polynucleotide phosphorylase utilizing a substrate-adsorbent column prepared as described hereinbefore. It is to be understood that other enzyme preparations may be similarly purified.

PREPARATION OF ENZYME

Numerous methods have been described in the art for the preparation of polynucleotide phosphorylase. The enzyme utilized in the following examples was prepared as follows:

Example 2

Freshly harvested, dried, *M. lysodeikticus* cells were made up to a 5% suspension in 0.01 tris buffer, pH 8.0. The temperature of the suspension was brought to 37° C. and crystalline lysozyme was added to make a final concentration of 25 mg. per 100 ml. (an equivalent amount of fresh or spray-dried egg white may also be used). The mixture was stirred slowly for about 10-15 minutes. The length of stirring is dependent upon the rate of lysis of the cells by lysozyme and is determined by the failure of the cell suspension to adhere to the walls of a container.

A saturated solution of ammonium sulfate (4° C.) was added to the lysed cells with stirring until the final concentration of ammonium sulfate was 33% saturation. The mixture was then centrifuged at 15,000 r.p.m. in a refrigerated centrifuge (4° C.) for 30 minutes. The supernatant liquid was collected and an additional amount of saturated ammonium sulfate solution added until the final concentration of ammonium sulfate was 60% saturation. The mixture was again centrifuged and the sediment dissolved in a small volume of TEM buffer, then dialyzed against the same buffer overnight at 4° C. An alternative method is to dialyze the solution against the buffer until the ammonium sulfate is removed.

A preliminary fractionation of the enzyme was carried out on diethylaminoethyl cellulose, previously washed with TEM buffer. The enzyme preparation was added to a column until approximately 50% of the upper half of the column was stained brown by the contaminating catalase. A linear gradient of KCl in TEM buffer was then applied. The steepness of the gradient is, of course, determined by the dimensions of the column, but typically with a column of about 3 cm. x 50 cm. dimensions, a gradient of from 0 to 0.3 M. potassium chloride is used with a total volume of 8 liters. The major fraction of the enzyme appears at approximately 0.25 M. potassium chloride, with a range of 0.2 to 0.3 M. potassium chloride. The active fractions of eluate are combined and brought to 65% saturation with ammonium sulfate. The precipitate is collected by centrifugation at 15,000 r.p.m. in a refrigerated centrifuge (4° C.), dissolved in TEM buffer and dialyzed against the TEM buffer until the ammonium sulfate is removed.

Other methods of preliminary purification may be employed, and it is preferred that the quantity of protein present in the enzyme preparation relative to the enzyme activity should be maintained as small as possible.

PURIFICATION OF ENZYMES

Example 3

Four (4) ml. of the fractionated enzyme prepared as described above in Example 2 was added to a diethylaminoethylcellulose-polyadenylic acid column, 0.75 by 10 cm. previously washed with TEM buffer. A linear gradient of potassium chloride in TEM buffer was applied in 0.1 M. increments per liter. Fractions totaling 625 ml. were collected and to the combined fractions was added 277 g. of solid ammonium sulfate with stirring until completely dissolved. The mixture was centrifuged at 15,000 r.p.m. for 30 minutes in a refrigerated centrifuge at 4° C. The sediment was dissolved in TEM buffer and dialyzed for 3 hours against the buffer to yield a final volume of 3.8 ml. polynucleotide phosphorylase enzyme. The results of this purification are summarized in Table I.

TABLE I

| Fraction | Yield of step (units) (c) | Turnover Number (a) | ε 280 mμ / ε 260 mμ (b) | Contaminating Enzymes ||| 
|---|---|---|---|---|---|---|
| | | | | ATPase | Myokinase | Phosphodiesterase |
| 30-60% (NH₄)₂SO₄ | 7,350 | 324 | 0.86 | + | + | + |
| DEAE | 2,300 | 756 | 1.50 | − | + | − |
| DEAE-poly A | 510 | 956 | 1.30 | − | − | − |

(a) Turnover number is defined as the moles of adenosine diphosphate converted to polyadenylic acid in one minute per 10⁵ g. of protein of the enzyme preparation.
(b) ε 280 mμ/ε 260 mμ ratio of absorption is a measure of the relative amount of nucleic acid and derivatives contaminating the enzyme preparation.
(c) A unit of enzyme is defined as that amount which will convert 1 micromole of ADP to polyadenylic acid in one minute under standard conditions of optimum substrate concentration.

Example 4

Four (4) ml. of the fractionated enzyme preparation prepared as described hereinabove in Example 2 was applied to a column prepared as in Example 1. The same procedure of purification was carried out. The results are summarized in Table II.

TABLE II

| Percent Yield | Turnover Number | ε 280 mμ / ε 260 mμ | Contaminating Enzymes |
|---|---|---|---|
| 23 | 950 | 1.41 | None present. |

Where it is desired to purify the enzyme preparation without utilizing a preliminary fractionation as described with reference to the preparation of the enzyme material, the dimensions of the column and the quantity of substrate-adsorbent material must be correspondingly increased to take care of increased contaminants present.

In summary this invention provides a method for enzyme purification which utilizes the specificity of an enzyme for its substrate and the adsorption characteristics of the substrate to separate the desired enzyme from contaminating enzymes which may also be present.

What is claimed is:

1. A process for purifying an enzyme useful in the synthesis of polynucleotides which comprises adsorbing a polyribonucleotide substrate for said enzyme upon an insoluble material which effectively binds said substrate, contacting a solution containing said enzyme with said substrate bound to said insoluble material to form an enzyme-substrate complex on said insoluble material and eluting said enzyme from said enzyme-substrate complex.

2. A process according to claim 1 wherein the enzyme is polynucleotide phosphorylase.

3. A process according to claim 1 wherein the polyribonucleotide substrate is polyadenylic acid.

4. A process according to claim 1 wherein the insoluble material is diethylaminoethyl cellulose.

5. A process for purifying polynucleotide phosphorylase which comprises adsorbing polyadenylic acid upon diethylaminoethyl cellulose, contacting a solution containing polynucleotide phosphorylase with said polyadenylic acid bound to said diethylaminoethyl cellulose to form a complex of said polynucleotide phosphorylase with said polyadenylic acid on said diethylaminoethyl cellulose and eluting said polynucleotide phosphorylase from said polynucleotide phosphorylase-polyadenylic acid complex.

References Cited by the Examiner

Tildon et al., "Biochim Biophys. Acta," 47, 199–202 (1961).

A. LOUIS MONACELL, *Primary Examiner.*